United States Patent [19]
Gilliland

[11] Patent Number: 5,237,153
[45] Date of Patent: Aug. 17, 1993

[54] TRANSFORMER AND POWER SUPPLY FOR PULSE-ARC WELDING STATION

[76] Inventor: Malcolm T. Gilliland, 310 Pine Valley Rd., Marietta, Ga. 30067

[21] Appl. No.: 697,309

[22] Filed: May 6, 1991

[51] Int. Cl.$^5$ ............................................. B23K 9/09
[52] U.S. Cl. ............................ 219/130.51; 219/130.1
[58] Field of Search ............ 219/130.1, 137 PS, 130.51

[56] References Cited
U.S. PATENT DOCUMENTS

| | | | |
|---|---|---|---|
| 3,016,484 | 1/1962 | Mulder et al. | 219/130.1 |
| 3,054,884 | 9/1962 | Manz et al. | 219/130.1 |
| 3,335,259 | 8/1967 | Mulder et al. | 219/130.1 |

Primary Examiner—Clifford C. Shaw
Attorney, Agent, or Firm—Jones & Askew

[57] ABSTRACT

A transformer (12) and power supply (10) for powering one or more welding stations (24). A spacing layered (12E) is inserted between the primary windings (12A, 12B, 12C) and the secondary windings (12F, 12G, 12H) so as to control the degree of coupling between these windings. In addition, impedances (11, 14, 17) may be used individually or collectively, alone or with the transformer (12), to achieve a desired output voltage-output current characteristic for the power supply (10). The output voltage at the connections (20, 21) of the power supply (10) drops off at a rate selected to minimize heating in the welding stations (24) while maintaining the quality of the weld being performed.

9 Claims, 1 Drawing Sheet

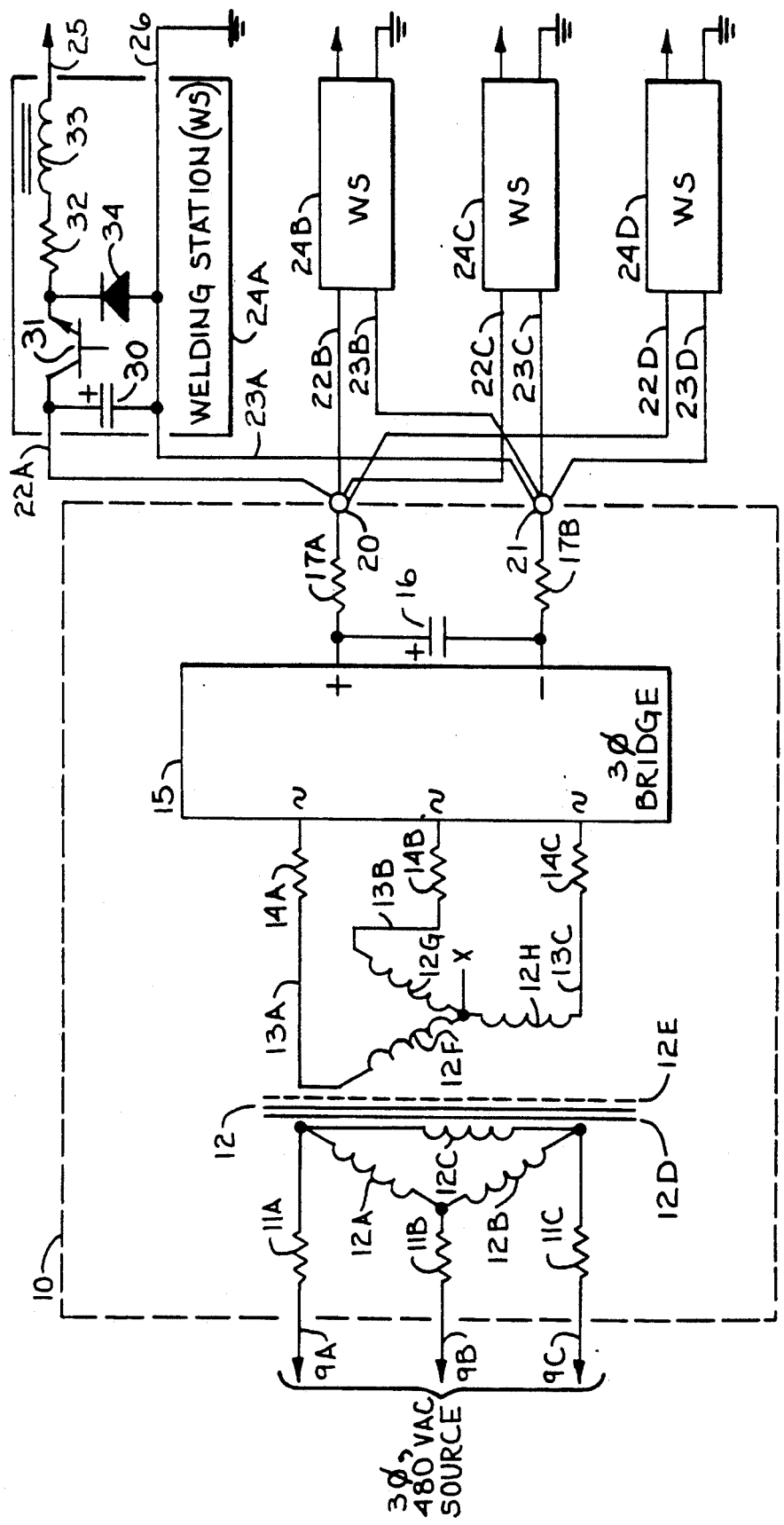

TRANSFORMER AND POWER SUPPLY FOR PULSE-ARC WELDING STATION

TECHNICAL FIELD

The present invention relates to the design of transformers and power supplies and, more particularly, discloses the design of a transformer and a power supply for use with one or more welding stations.

BACKGROUND OF THE INVENTION

Electronic arc welding stations are in widespread use and some of these stations provide for a wide range of arc welding operations, from constant-current DC arc power and low frequency pulsed arc power to high frequency pulsed or chopped arc power. It is well known in the art to provide an inductor and a flywheel diode in the circuitry of the welding station so that when the power transistor in the welding station is in the pulse-off state the inductor and the flywheel diode provide a source of current which maintains the arc alive until the power transistor is returned to the pulse-on state. For higher pulse or chopping rates the inductor provides for limiting of the arc current. However, for low frequency pulse and DC modes of operation the inductor provides little current limiting and may even saturate. The lack of current limiting causes a higher current to flow than is normally present when a high frequency pulse rate is used. Furthermore, the higher current flow can cause a significant swing in the output of the power supply which is powering the welding station. The swing in the output voltage can adversely affect the arc characteristics, the uniformity of the arc, and the quality of the weld.

To avoid this problem it is common to use a large filter capacitor at the welding station to provide additional current during the time that the power transistor is in the pulse-on state. In addition, to further reduce the voltage swing at the output of the power supply it is common to design the power transformer in the power supply to provide minimal voltage drop when the desired current is being drawn. Of course, this requires the use of larger primary windings, a larger core, and larger secondary windings so as to reduce the resistive ($I^2R$) losses in the transformer. However, this drives the price of the transformer upward. Therefore, a compromise is usually made in that the cost is held down by sizing (selecting the size of the wire and the number of turns) the primary and secondary conductors in the core such that the transformer will not saturate under a no-load condition and so that the swings in the output voltage cause adverse effects which are of a tolerable degree. Likewise, the size of the filter capacitor is selected as a compromise among the factors of size, weight, cost, and performance of the welding station.

Some welders, such as short arc welders, use a transformer, a rectifier, and an output impedance, such as an inductor or a resistor. These types of welders are not pulse arc welders and are complete in themselves. That is, they do not require an electronic welding station to be attached in order to perform welding operations. Examples of these types of welders are shown in the following U.S. Pat. Nos. 3,278,721; 4,117,304; and 4,251,710. In these types of welders the open circuit output voltage is selected to be high enough to provide reliable and efficient arc striking, typically 60 to 80 volts, and the transformer impedance and the output impedance are selected to cause the output voltage to drop to a practical arc sustaining voltage, such as 20 to 25 volts, once the arc has been struck.

However, pulse arc welding stations typically contain current sensing circuitry which adjusts the output pulse width in response to the output current. Also, these electronic welding stations typically give erratic or poor performance, or even cease operating, if the input voltage drops substantially. Therefore, the power supply for a pulse arc electronic welding station is typically made to be as stiff as is economically feasible.

The use of a "stiff" power supply, that is, one in which the swing in the output voltage is minimized, and the addition of economically feasible and realistically sized high-capacitance filter capacitors in the welding station improve the characteristics of the arc by stabilizing the voltage going into the welding station but also cause other problems.

In particular, it has been found that the use of such a stiff power supply and such filter capacitors causes, in the low frequency pulse mode, excessive heating of the filter capacitors, the output inductor, the power transistors, and the resistors used for current balancing when several transistors are used in parallel to achieve the desired welding current. It is believed that the cause of the excessive heating in the filter capacitors is at least partly due to the resistive losses in the capacitor which occur during the charging of the capacitor (when the power transistor is in the pulse-off state) because the stiff power supply has a low impedance and provides very little limiting of the charging current, and the discharging of the capacitor (when the power transistor is in the pulse-on state). The cause of the excessive heating in the power transistors is believed to be due to the turn-off time of the transistors. More particularly, a transistor transitions from the on-state to the off-state in a finite, non-zero amount of time. During this finite amount of time the current flow through the transistor is decreasing but the voltage across the transistor is increasing. During this time the transistor is not in either of its normal low power dissipation states: at or near saturation; or turned off. Therefore, the more stiff that the power supply is then the less the voltage will drop during the pulse-on state and therefore the larger the voltage that will be impressed across the power transistors when the power transistors are transitioning from the on-state to the off-state.

SUMMARY OF THE INVENTION

The present invention provides a method of designing a transformer and a power supply which provides for satisfactory welding characteristics during both high frequency and low frequency pulse welding and, in addition, provides for reduced power dissipation by the components in the welding station during low frequency pulse operation.

The present invention provides a design for a transformer which has a predetermined amount of droop (voltage drop for a specified current). The present invention comprises a transformer having a core, a primary winding on the core, a spacing layer around the primary winding, and a secondary winding wound on the spacing layer. The thickness of the spacing layer is adjusted so as to provide a predetermined voltage droop characteristic. This voltage droop characteristic is selected to reduce the amount of heat generated in the welding station, particularly in the power transistors, and to provide a voltage which is stable enough to allow for uniform, quality welding.

In addition, the present invention comprises a power supply having a transformer, a rectifier, an output connection, and an impedance connected at a selected one of several points. The value of the impedance is selected to provide the desired voltage droop characteristic.

The present invention further comprises a combination of a transformer with a selected thickness for a spacing layer in conjunction with the use of a selected impedance at a selected location so that the combination of the voltage droop provided by the transformer and the voltage droop provided by one or more selected impedances provide the overall desired voltage droop.

Therefore, it is an object of the present invention to provide a transformer design which provides a voltage droop selected to provide good welding characteristics and minimize heating of the components in the welding station.

It is another object of the present invention to provide selected impedances at predetermined points in a power supply so as to provide a desired voltage droop which provides for good welding characteristics and minimizes heating of the components in the welding station.

BRIEF DESCRIPTION OF THE DRAWING

The FIGURE is a schematic diagram of the preferred embodiment of the present invention.

DETAILED DESCRIPTION

Turning now to the drawing, FIG. 1 is a schematic diagram of the preferred embodiment of the present invention. Welding power supply 10 provides operating power to a plurality of welding stations 24A-24D. The welding stations 24 are preferably of the type described in the following referenced documents, all of which are hereby incorporated herein by reference. The referenced U.S. Pat. Nos. 4,716,274; 4,896,018; 4,870,248; and 4,922,161. The referenced U.S. patent application is Ser. No. 07/374,465, filed Jun. 30, 1989. In the preferred embodiment, power supply 10 provides operating power for four welding stations 24. This number was selected so that, in a given facility, each power supply would provide operating power to a limited number of welding stations so that, if reversed polarity welding was desired, the number of normal polarity welding operations that would have to be suspended during the reversed polarity welding operation would be kept to a minimum. It will be appreciated that this is a design choice and a greater or a smaller number of welding stations may be powered by a power supply.

Power supply 10 is connected by conductors 9 to a three-phase source of AC power, preferably having a line-to-line voltage of 480 volts. The output of power supply 10 is connected by conductors 22 and 23 to welding stations 24. Each welding station 24 has two output terminals, T1 and T2, one of which is typically connected by a conductor 26 to a ground point, such as the frame of a ship, and the other of which is connected by conductor 25 to the arc welding torch (not shown) used for the actual welding operation.

Welding station 10 has a transformer 12, a three-phase bridge rectifier 15, an output filter capacitor 16 and may have impedances 11, 14, and/or 17. In one embodiment, transformer 12 is a loosely-coupled transformer, as described further herein below, and impedances 11, 14, and 17 are not used. In another embodiment, transformer 12 is a conventional tightly-coupled transformer, and at least one of impedances 11, 14 and/or 17 are used. In another embodiment, transformer 12 is a loosely-coupled transformer and at least one of impedances 11, 14, and 17 are used. For simplicity, this last embodiment will be described with particularity although it should be understood that the other embodiments may be obtained by replacing unwanted impedances with a short circuit and using a loosely-coupled or a tightly-coupled transformer 12, as desired.

Transformer 12 preferably has a delta-connected primary having coils 12A, 12B, and 12C, a laminated iron/steel E-I core 12D, a spacing layer 12E, and a Y-connected secondary having coils 12F, 12G, and 12H. The neutral connector of the secondary winding is not used. The primary winding of transformer 12 is connected to the source of AC power via conductors 9A-9C and series impedances 11A-11C. The secondary windings of transformer 12 are connected to the inputs of bridge 15 via conductors 13A-13C and series impedances 14A-14C. The positive output of bridge 15 is connected to the positive terminal of capacitor 16 and, through series impedance 17A, to positive output connection 20. The negative output of bridge 15 is connected to the negative terminal of capacitor 16 and, through series impedance 17B, to negative output connection 21.

Each welding station 24 contains an input filter capacitor 30, a power transistor (or bank of transistors) 31, an output resistor 32, an output inductor 33, and a flywheel diode 34. It will be appreciated that this is a very limited schematic of a welding station and that the drive circuitry, current limiting circuitry, arc characteristic selection circuitry, etc., are not shown. Detailed information on the design and operation of these welding stations is provided in the referenced documents.

It will be appreciated by those of skill in the art that if impedances 11 are used and the primary winding of transformer 12 is either delta-connected or is Y-connected with the neutral not being used then it is only necessary to use any two of impedances 11A-11C to maintain a balanced current flow among the conductors 9. Likewise, it is only necessary to use any two of impedances 14A-14C to maintain a balanced current flow among the conductors 13A-13C. Also, if an impedance is to be used between the output of bridge 15 and connections 20 and 21, it is purely a matter of design preference as to whether impedance 17A, 17B, or both, is used.

In the preferred embodiment, the primary winding of transformer 12 consists of three coils 12A-12C, each of which is 186 turns of number 11 round copper wire wound on a type E-I 2.4 inch leg by 3.8 inch wide stack core 12D, using 0.01 inch thick laminations. A spacing layer is then wound or wrapped around the primary winding so as to separate and insulate the primary and secondary windings. Spacing layer 12E is 3½ to 5 layers of NOMEX 0.025 inch insulation, which yields a total spacing thickness of approximately 3/32 to ⅛ inch. For a tightly-coupled transformer 12, the thickness of the spacing layer is reduced to approximately 1/32 inch. The secondary winding consists of three coils 12F-12H, each of which is 14 turns of 0.012 inch thick by 5.5 inch wide copper foil. The thickness of the spacing layer affects the coupling between the primary winding and the secondary winding; a thicker spacing layer provides for less (looser) coupling between the windings. If all other characteristics are held constant, a looser coupling between the windings will cause a greater output voltage drop off when the output of the transformer is loaded.

If a tightly-coupled transformer 12 is used and impedances 14 and 17 are not used then impedances 11A–11C each have a value of approximately 0.85 ohms. If a tightly coupled transformer 12 is used and impedances 11 and 17 are not used then impedances 14A–14C each have a value of 0.013 ohm. If a tightly coupled transformer 12 is used and impedances 11 and 14 are not used then impedances 17A and 17B have a total impedance of approximately 0.03 ohms. If a combination of impedances 11, 14 and 17 are used, or if one or more impedances 11, 14 and 17 are used in conjunction with a loosely coupled transformer 12, then the value of the impedances and the coupling of the transformer should be selected to provide the desired output voltage droop at the specified current level. Impedances 11, 14 and 17 may be resistors, inductors, or a resistor/inductor combination.

The presence of impedances 11, 14, and 17, and the looser coupling of transformer 12, cause the output voltage at connectors 20 and 21 to drop when welding stations 24 are operating. The desired voltage drop is determined primarily by two considerations: a greater voltage drop provides for less heating of the components of welding stations 24, but increases the effects upon the arc characteristics of the welding operations being performed by the welding stations 24. These two considerations will set a range of voltage drops which optimize the performance of the welding stations 24. For the welding stations described in the referenced documents it has been experimentally determined that a voltage drop, measured at connections 20 and 21, of two to four volts, when power supply 10 is providing approximately 100 amps to welding stations 24, provides for a satisfactory compromise between the two criteria. Of course, if a different number of welding stations is used, or if welding stations other than those described in the referenced documents are used, then the range of optimum voltage drops may be different than the above.

Inductors can also be used for impedances 11 and 14. For example, it has been found that, for impedances 14, an inductor which gives satisfactory performance consists of 10 turns of number 2 wire wound on a closed core having a cross section of approximately one inch by 1½ inch. One such inductor was used for each of impedances 14A, 14B and 14C. Inductors have also been used for impedances 17 and, in this case, it was experimentally determined that each inductor should be 16 turns of number 1/0 wire, wound upon a 1½ inch by 2½ inch core.

Capacitor 16 has a value of 45,000 microfarads, provides some filtering and, in conjunction with the impedances and the looser coupling, provides some protection against voltage surges on conductors 9.

The loose coupling and the inserted impedances serve to limit the current that can flow into the input filter capacitor 30 in a welding station 24. This reduces the internal heating of capacitor 30 because the heating is proportional to the square of the current. Therefore, to replenish the same charge, a higher charging rate will heat capacitor 30 more than a lower charging rate. Also, the looser coupling and inserted impedances serve to limit the charge that can be provided to capacitor 30 and, therefore, the charge that can be discharged from capacitor 30 through output transistors 31. This also serves to reduce the heating of capacitor 30. Of course, the heating of capacitor 30 can also be reduced by using a capacitor which has a lower effective series resistance, or by using more capacitors in parallel so that the charge and discharge current through any capacitor is reduced, but these methods require capacitors which are more expensive, a larger number of capacitors, and/or a larger volume for the capacitors.

Of course, the loose coupling and the inserted impedances 11, 14, and 17 also serve to reduce the input voltage to the welding station 24. Therefore, during the on-to-off transitions of the power transistors 31 the voltage imposed across the transistors 31 will be reduced during the time that the transition current is flowing. This reduces the heating of the transistors 31.

In the design of a power supply for a welding station the use of a tightly-coupled transformer and the elimination of inserted impedances is an obvious design choice and welding stations 24 provide for a high quality of welding operation if this conventional and obvious power supply design is used. Furthermore, it would be expected that the use of a drooping power supply would adversely effect the quality of the welding operations. However, the use of a loosely-coupled transformer and inserted impedances 11, 14 and/or 17 reduces the heating of the components in the welding station 24 and, rather unexpectedly, also provides for an even higher quality of welding operation.

From the above, it will be appreciated that the range of permissible voltage drops may be experimentally determined by connecting a desired number of welding stations 24 to the power supply 10 and adjusting the impedances (such as by rheostats) and/or substituting transformers 12 with different coupling factors until the heat dissipated by the components of the welding stations 24 is reduced to an acceptable level and the quality of the welds obtained is still at a satisfactory level.

It will be appreciated from the above that the present invention is a transformer and a power supply which reduces heating in the components of welding stations, especially during low frequency pulsed operation. Other embodiments will suggest themselves to those of skill in the art based upon a reading of the detailed description above. Therefore, the scope of the present invention is to be limited only by the claims below.

I claim:

1. A power supply providing operating power to a pulse-arc electronic welding station, comprising:
   a transformer having a primary winding and a secondary winding, said primary winding being for connection to a source of AC power;
   a rectifier having an input and an output, said input being connected to said secondary winding;
   an output connection connected to said output of said rectifier for providing an output voltage and an output current to said pulse-arc electronic welding station; and
   an impedance connected in one of the following locations: between said source of AC power and said primary winding, between said secondary winding and said input of said rectifier, and between said output of said rectifier and said output connection;
   the value of said impedance being selected to cause the difference between said output voltage at no output current and said output voltage at a predetermined output current to be within a specified range of voltages, said range of voltages being such that a satisfactory arc is produced by said pulse-arc electronic welding station and such that heating of said pulse-arc electronic welding station is reduced.

2. The power supply of claim 1 wherein said impedance comprises a resistor.

3. The power supply of claim 1 wherein said impedance comprises an inductor.

4. A power supply providing operating power to a pulse-arc electronic welding station, comprising:
   a transformer having a core, a first winding wound on said core, a spacing layer wound on said first winding, and a second winding wound on said spacing layer, a selected one of said windings being for connection to a source of AC power;
   a rectifier having an input and an output, said input being connected to the non-selected one of said windings;
   an output connection connected to said output of said rectifier for providing said operating power by providing an output voltage and an output current to said pulse-arc electronic welding station;
   an impedance connected in one of the following locations: between said source of AC power and said selected one of said windings, between said non-selected one of said windings and said input of said rectifier, and between said output of said rectifier and said output connection;
   the thickness of said spacing layer and the value of said impedance being selected to cause the difference between said output voltage at no output current and said output voltage at a predetermined output current to be within a predetermined range of voltages, said range of voltages being such that a satisfactory arc is produced by said pulse-arc electronic welding station and such that heating of said pulse-arc electronic welding station is reduced.

5. The power supply of claim 4 wherein said impedance comprises a resistor.

6. The power supply of claim 4 wherein said impedance comprises an inductor.

7. The power supply of claim 4 wherein said first winding is said selected one of said windings and said second windings is said non-selected one of said windings.

8. A transformer providing operating power to a pulse-arc electronic welding station, comprising:
   a core;
   a first winding wound on said core;
   a spacing layer wound on said first winding; and
   a second winding wound on said spacing layer;
   a selected one of said windings being for connection to a source of AC power and the non-selected one of said windings being for providing said operating power by providing an output voltage and an output current;
   the thickness of said spacing layer being selected to cause the difference between said output voltage at no output current and said output voltage at a predetermined output current to be within a predetermined range of voltages, said range of voltages being such that a satisfactory arc is produced by said pulse-arc electronic welding station and heating of said pulse-arc electronic welding station is reduced.

9. The transformer of claim 8 wherein said first winding is said selected one of said windings and said second winding is said non-selected one of said windings.

* * * * *